US012081918B2

(12) United States Patent
Pikart et al.

(10) Patent No.: US 12,081,918 B2
(45) Date of Patent: Sep. 3, 2024

(54) OPTICAL ARRANGEMENT AND METHOD

(71) Applicants: ams OSRAM Automotive Lighting Systems GmbH, Munich (DE); Continental Automotive Technologies GmbH, Hannover (DE)

(72) Inventors: Philip Pikart, Munich (DE); Tobias Huber, Sinzing (DE)

(73) Assignees: ams OSRAM Automotive Lighting Systems Gmbh, Munich (DE); Continental Automotive Technologies Gmbh, Hannover (DE)

( * ) Notice: Subject to any disclaimer, the term of this patent is extended or adjusted under 35 U.S.C. 154(b) by 343 days.

(21) Appl. No.: 17/627,670

(22) PCT Filed: Jul. 20, 2020

(86) PCT No.: PCT/EP2020/070480
§ 371 (c)(1),
(2) Date: Jan. 15, 2022

(87) PCT Pub. No.: WO2021/013809
PCT Pub. Date: Jan. 28, 2021

(65) Prior Publication Data
US 2022/0279153 A1     Sep. 1, 2022

(30) Foreign Application Priority Data

Jul. 22, 2019 (DE) .......................... 102019119796.1
Aug. 23, 2019 (DE) .......................... 102019212673.1

(51) Int. Cl.
*H04N 9/31* (2006.01)
*B60K 35/00* (2006.01)
(Continued)

(52) U.S. Cl.
CPC ........... *H04N 9/3194* (2013.01); *B60K 35/00* (2013.01); *G03B 21/62* (2013.01);
(Continued)

(58) Field of Classification Search
CPC .... H04N 9/315; H04N 9/3108; H04N 9/3141; H04N 9/3194; G03B 21/28; G03B 21/62;
(Continued)

(56) References Cited

U.S. PATENT DOCUMENTS 8,766,766 B2 *  7/2014  Yamamoto ............... G06K 7/00
                                                    340/5.1
9,041,691 B1 *  5/2015  Haskin ................... G03B 21/26
                                                    345/175
(Continued)

FOREIGN PATENT DOCUMENTS

CN     104076914 A     3/2013
DE     102008020279 A1 3/2009
(Continued)

OTHER PUBLICATIONS

Office action of the Chinese Patent Office dated Nov. 29, 2023, in the related Chinese patent application CN 2020800528872 and an English translation of the Office action (15 pages).
(Continued)

*Primary Examiner* — Sultan Chowdhury
(74) *Attorney, Agent, or Firm* — Imperium Patent Works; Darien K. Wallace (57) ABSTRACT

The invention relates to an optical arrangement comprising at least one spatial modulator for light, comprising at least one light source and comprising at least one projection region, it being possible for the spatial modulator to be irradiated by the light from the light source and the projection region being connected downstream of the spatial modulator in the beam path of the light, characterized in that
(Continued)

the light source can be at least temporarily modulated and the modulator can be controlled such that at least one portion of the projection region can be irradiated by the modulated light, and in that the optical arrangement comprises at least one sensor, by means of which a change to the modulatable light owing to a body approaching and/or retreating and/or being arranged at or in the portion can be detected. The invention further relates to a method using the optical device.

20 Claims, 3 Drawing Sheets

(51) Int. Cl.
  *G03B 21/62* (2014.01)
  *G06F 3/04883* (2022.01)
  *B60K 35/60* (2024.01)

(52) U.S. Cl.
  CPC ....... *G06F 3/04883* (2013.01); *H04N 9/3108* (2013.01); *H04N 9/3155* (2013.01); *B60K 35/60* (2024.01); *B60K 2360/334* (2024.01); *B60K 2360/785* (2024.01)

(58) Field of Classification Search
  CPC ............... G03B 21/147; G03B 21/145; G03B 21/2013; G03B 21/2033; G03B 21/2053; G03B 21/2066; G06F 3/0421; G06F 3/0423; G06F 3/0428; G06F 3/04883; B60K 37/06; B60K 35/00
  See application file for complete search history.

(56) References Cited

U.S. PATENT DOCUMENTS

| | | | | |
|---|---|---|---|---|
| 9,625,799 B2* | 4/2017 | Kiyose | .................. | G03B 21/16 |
| 2006/0158516 A1* | 7/2006 | Suginobu | ............. | H04N 9/3194 |
| | | | | 348/602 |
| 2007/0046903 A1* | 3/2007 | Takeda | ................... | G03B 21/10 |
| | | | | 353/77 |
| 2008/0211779 A1 | 9/2008 | Pryor | ...................... | G06F 3/041 |
| | | | | 345/173 |
| 2012/0256879 A1 | 10/2012 | Liu et al. | ................ | G06F 3/042 |
| | | | | 345/175 |
| 2012/0326958 A1 | 12/2012 | Deuel et al. | ............. | G09G 5/00 |
| | | | | 345/156 |
| 2013/0342493 A1 | 12/2013 | Crow et al. | ............. | G06F 3/042 |
| | | | | 345/174 |
| 2015/0116603 A1* | 4/2015 | Guthrie | ................ | H04N 9/3182 |
| | | | | 353/34 |
| 2015/0116672 A1 | 4/2015 | Woltman et al. | ...... | G03B 21/20 |
| 2018/0278900 A1* | 9/2018 | Wakimoto | ............ | G06F 3/0428 |
| 2019/0098725 A1 | 3/2019 | Sadwick et al. | ... | H05B 33/0872 |

FOREIGN PATENT DOCUMENTS

| | | |
|---|---|---|
| DE | 102013203183 A1 | 8/2014 |
| EP | 1992515 A1 | 11/2008 |
| EP | 2213501 A2 | 8/2010 |
| EP | 3588258 A1 | 1/2020 |
| WO | WO2004/091956 A2 | 3/2004 |
| WO | WO 2016/109839 A1 | 7/2016 |

OTHER PUBLICATIONS

International Search Report dated Oct. 16, 2020 from the European Patent Office in the related PCT application PCT/EP2020/070480 (4 pages).

Search Report dated Apr. 16, 2020 from the German Patent Office in the priority German application DE 102019212673.1 (10 pages).

English translation of the Search Report dated Apr. 16, 2020 from the German Patent Office (4 pages).

English translation of the Written Opinion of the International Searching Authority prepared by the European Patent Office in the international application PCT/EP2020/070480 as forwarded to the Int'l Bureau of WIPO on Oct. 27, 2020 (6 pages).

* cited by examiner

OPTICAL ARRANGEMENT AND METHOD

CROSS REFERENCE TO RELATED APPLICATION

This application is a U.S. National Stage entry under 35 U.S.C. § 371 based on International Application No. PCT/DE2020/070480, filed on Jul. 20, 2020, which was published under PCT Article 21(2) and which claims priority from German Application No. 102019119796.1, filed on Jul. 22, 2019 and from German Application No. 102019212673.1, filed on Aug. 23, 2019. The disclosure of each of the foregoing documents is incorporated herein by reference.

TECHNICAL FIELD

The invention relates to an optical arrangement comprising at least one spatial modulator for light, at least one light source and at least one projection region. Furthermore, the invention relates to a vehicle, a windowpane for a vehicle and a method using the optical arrangement.

BACKGROUND

A large number of projection applications require or desire the interaction of a user with an image projected from a projector, for example, a DMD (Digital Micromirror Device) projector. For instance, in the projection of a projector onto a pane, e.g., onto the side pane of a vehicle or a viewing panel in a shopping mall, it is desired that a movement and/or reaction, such as, for example, a gesture and/or pressure movement and/or the touch of a user from inside as well as from outside to the projection projected onto the pane be recognized. For example, a keyboard can be projected and/or a numeric keypad and/or a symbol field, and the user may make an entry, preferably on both sides of the pane onto which the projection is projected. In other words, the surface onto which the projection is projected is to serve as an image, as in the case of a smartphone or tablet, and gestures and touches on the projection surface are to be recognized.

For recognizing a gesture and/or a touch, laser scanner and/or ToF (time of flight) sensors (3D camera system with transit time method) and/or a combination of a projector and an additional camera and/or infrared or ultrasonic sensors are known. In ToF sensors, for example, the projection is irradiated with light of an additional illumination unit, and the ToF sensor measures the transit time of the light for each image point of the projection. If the transit time changes, it is assumed that the image point was touched. The illumination unit generally is very complex. For instance, a pulsed laser beam is required, which can be emitted only via an expensive illumination unit. The camera may recognize, for example, a projection onto a surface and a gesture and/or touch and subsequently abstract the movement of a user, e.g., a movement of the hand. In a detection by infrared and/or ultrasonic sensors, for example, distances of bodies and/or gestures may be recognized. All systems have in common that in addition to the projector an additional sensor module is integrated in the system, which often also has to be mounted physically separated from the projector. This increases complexity, for example, the timing of the signals and/or signal transit times, undesirable reflections may occur in the case of a projection onto a pane, and moreover the system is very cost-intensive. In addition, the additional sensor module does not allow for a compact design. Furthermore, simultaneous detection of interactions on both sides of the pane is often not possible. If a camera is used to detect a reaction and/or movements, an angular offset additionally occurs between the projector and the camera lens, which the system has to take account of. Here, there is not only the difficulty of allowing for the angular offset, but also unwanted reflections may arise due to environmental influences, for example, due to an unfavorable position of the sun.

SUMMARY

It is an object of the invention to provide an optical arrangement that is simple in terms of the device and inexpensive and that enables interaction of a user with a projection. A further object of the invention is to provide a vehicle that includes the optical arrangement and is simple in terms of device and low in cost. Moreover, a pane that is simple in terms of the device, low in cost and that includes the optical arrangement is to be provided, as well as a simple method that uses the optical arrangement.

According to the invention, an optical arrangement comprising at least one spatial modulator for light (SLM (spatial light modulator)) is provided. The modulator may be, for example, a spatial micromirror device (a digital micromirror device DMD) or a liquid crystal display (LCD) or one or plural micro-electromechanical systems (MEMS) or liquid crystal on silicon (LCOS) or mono-materials. Furthermore, the optical arrangement includes at least one light source and at least one projection region. The spatial modulator is irradiated by the light from the light source, and the projection region is connected downstream of the spatial modulator in the beam path of the light, i.e., the light of the light source is guided to the projection region via the modulator at least partially or completely. Furthermore, the light source can be at least temporarily modulated, and the modulator can be driven such that at least one partial area or operating range of the projection region can be irradiated with the modulated light. Via the modulated light of the light source, which is led via the modulator to the projection region, a projection can be generated at least partially. Moreover, the optical arrangement has at least one sensor. The sensor is formed in such a way that it is able to detect the light emitted by the light source, in particular backscattered and/or scattered light, of the projection region. Furthermore, a change in the modulated light can be determined, the change occurring in particular due to an approach and/or retreating and/or due to an arrangement of a body to or in the partial area. In other words, the sensor, which in particular is aligned such that it detects the light of the projection region, in particular detects backscattered light from a body and/or scattered or reflected light. That is, via the modulated light at least a portion of the projection is generated in the projection region. If a body touches the portion of the projection in the projection region generated via the modulated light, or approaches same, the modulated light reflected and/or backscattered and/or scattered can be detected by the sensor.

The invention has the advantage that by using additional inexpensive hardware, i.e., a sensor, in the optical arrangement, an interaction with an operator and/or a body is possible because the sensor is able to detect a change in the modulated light of the projection area. Another advantage is that the optical arrangement can be structured similar to a conventional projector, which can be adopted almost unchanged, and that only the corresponding software and/or application adaptations must be performed in addition to integration of the sensor. This means that the optical arrangement is particularly inexpensive, especially when compared to conventional systems for the detection of touches in a projection region. In conventional interactive visual systems a body, e.g., the hand of a user, is detected via a scan of the environment. For this purpose, a LIDAR (light detection and ranging) system, or a ToF (time of flight) sensor or stereoscopy may be used, for example. Compared to the optical arrangement, those systems require high technical effort, and the components that are required in addition to a conventional projector are very expensive because the systems require, for example, the generation of a 3D model of the environment of the projection region. This is not necessary in the optical arrangement. Furthermore, in the optical arrangement the image projected in the projection region can be projected via the modulated light and therefore no further projector is necessary in order to generate the projection, and merely a sensor is provided for detecting the modulated light in the projection system. Therefore, as opposed to conventional systems, costs and installation space can be saved additionally, as an active sensor module and an additional illumination unit, such as, for example, a camera or a ToF sensor and a laser light source, are not necessary. A further advantage is that the sensor is able to detect the approaching and/or retreating and/or an arrangement of a body to or in the portion by way of an analog signal, i.e., by a change, in particular an amplitude, in the modulated light and that from this in particular gestures can be recognized. This is advantageous, as for example the use of a digital signal does not allow for the detection of information on the kind of touch, but merely for the detection of an "on/off" state. Moreover, extended functions such as a distance sensor may be realized because it can be derived via the modulated light detected by the sensor at what distance a body is to the partial area and/or the projection region. Moreover, the optical arrangement is less complex than conventional projectors, by which interaction is enabled. A further advantage is that the sensor can be placed to the spatial modulator and/or to a different place of the optical arrangement in a flexible manner, which simplifies the overall application.

In particular the change of amplitude of the modulated light is detected by the sensor. The light source emits modulated light, which is led to the projection region via the modulator and through which at least the portion of an image can be projected in the projection region. The light reflected by the projection region is detected by the sensor. If a body touches the at least partial area of the projection in the projection region, which is projected via the modulated light, or comes into the vicinity of it, in particular the amplitude of the modulated light reflected from the projection region changes. For example, the amplitude of the modulated light that is detected by the sensor may become smaller when a body touches the portion of the projection of the projection region that is generated by the modulated light. Thus, the optical arrangement can easily detect whether a body touches a portion of the projection in the projection region generated by the modulated light. For example, via the optical arrangement, an image may be projected in the projection region, which has at least two portions generated via modulated light, the modulation frequencies of the modulated light via which the respective portions are projected each being different. If a body touches one of those portions, the sensor easily detects a change in the modulated light of that portion, in particular a change in the amplitude. As the modulated light of the portions is distinguished from one another, which portion was touched can moreover be detected in a simple and inexpensive manner.

Preferably, the optical arrangement has a demodulator, which can be configured to evaluate the changes detected by the sensor and/or the sensor signals detected by the sensor. In addition, it is also possible for the demodulator to detect from the sensor signals an approach to the portion by at least the body, e.g., a hand or a finger and/or a person. Also a touch of the partial area by at least two bodies can be detected by the demodulator through the sensor signal, i.e., the demodulator may detect, for example, an approach and/or a touch with at least two fingers and/or bodies. The demodulator may be, for instance, an RF demodulator (radio frequency demodulator), also referred to as HF demodulator (high frequency demodulator). This is advantageous because such a demodulator is inexpensive.

The change which is detected by the sensor and which can be evaluated via the demodulator by way of a sensor signal may vary in strength. A change in light, for example, may be very low if, e.g., a body touching the partial area is dirt and/or a different small body touching the partial area in particular unintentionally. Therefore, it is advantageous that, e.g., a threshold value of the change is defined and, if the change exceeds such threshold value, an action, for example, a change of projection by the optical arrangement, may be released and/or an operation may be registered.

Furthermore, the optical arrangement may include at least one computing element through which the modulator or the light source can be controlled so that at least a portion of the projection region can be irradiated with modulated light. In other words, if, for example, one portion is irradiated with modulated light and another portion is irradiated with unmodulated light, the computing element may control the light source and the modulator such that those portions are displayed separately time-wise, but simultaneously to an eye, as e.g. in an RGB projector with a modulator, e.g., with a DMD in which the colors are displayed separately time-wise but simultaneously to an eye. It is also possible for the computing element to drive the modulator and the light source such that at least two portions can be irradiated with differently modulated light. The demodulator and the computing element may form a common controller.

Preferably, the modulation frequency of the light source is higher, in particular at least ten times, than the switching frequency of the spatial modulator. In other words, the modulation frequency preferably clearly exceeds the switching frequency of the modulator. Modulation frequencies may be, for example, within a range of 100 KHz to several MHz. If, for example, several portions are irradiated with modulated light, those portions each have different modulation frequencies, which may amount to, for example, 100 KHz, 105 KHz and 110 KHz, etc. This is advantageous because an optimum signal-to-noise ratio may thereby be achieved, and a touch of the portion by a body and/or a movement of the body, i.e., an approach and/or retreating and/or an arrangement of the body to or in the partial area, may be optimally detected. Furthermore, it is advantageous as the modulator has a lower switching frequency and detection of a touch of the partial area thus can be optimally executed.

Preferably, the sensor detects a modulation frequency of the light and a change in the light with such modulation frequency. In other words, a sensor signal changes in a corresponding frequency component of the modulation frequency, i.e., the sensor signal which in particular includes the modulation frequency of the light of the light source, changes.

Preferably, the sensor may be a photo sensor and/or a photo detector, the band width of which at least detects a modulation frequency, so that a change in the modulated light may be reliably detected by the sensor. This is advantageous because such a sensor is particularly inexpensive. Alternatively or additionally, the sensor may detect the change of an amplitude of the modulated light. In other words, by touching a partial area, the amount of light and/or a light intensity of the modulated light and/or of unmodulated light may change and the sensor measuring, for example, an amount of light and/or the light intensity, is able to recognize such change. In other words, the sensor also is able to detect a change in unmodulated light.

Furthermore, the projection region preferably is disposed on an at least partially transparent layer such as, for example, the side window of a motor vehicle and/or a different glass surface and/or a plexiglass surface and/or a windshield. Alternatively or additionally, the projection region may also be a beam path of the light of the light source. In other words, the partial area may be part of the at least partially transparent layer, i.e., a partial surface of the layer and/or the partial area may be a beam path of the modulated light. If several partial areas with differently modulated light are provided, those areas may constitute different partial areas of the layer and/or the partial areas may constitute respective beam paths of the respectively modulated light.

Moreover, the layer may be coated electrophoretically so that it can be switched between an opaque state and a transparent state. A projection may be preferably performed when the layer is opaque and the light striking the layer is scattered. This is advantageous as the projection thus is well visible on the projection region, e.g., also in sunlight.

Furthermore, partial areas, i.e., partial surfaces, the light of which can be detected by the sensor, may be located on opposite sides of the layer. This means that an approach and/or retreating and or arrangement of a body in the partial area can be detected by the demodulator and/or by the sensor on both sides of the layer. This means that the sensor is able to recognize a change in the light of the partial area regardless on which side of the pane the partial area is located, and/or the demodulator is able to detect a body from the evaluated sensor signal both when approaching from one side of the layer and when approaching from the other side of the layer. Alternatively and/or additionally, the partial area, which may be a beam path of the modulated light, can be continued on both sides of the layer and the sensor can detect a change in the light of the partial area on both sides of the layer.

A change in the modulated light may, for example, be a change in transmittance, i.e., passing through, of the modulated light through the layer. In other words, the sensor is able to detect a change in the light shining through the layer. Moreover, a change in the modulated light may be a change of a reflection of the modulated light on the layer, which means through or on the partial area. In other words, the sensor is able to detect a change in the light that is reflected by the layer.

The demodulator detects, for example, a change in the light, e.g., in the amplitude of the light and a change of the frequency component and/or a change of the modulation frequency of the light by way of waveform analysis. The sensor signal detected by the sensor preferably is communicated to the demodulator which recognizes, e.g., by way of a Fourier transformation, particularly if several partial areas are irradiated with differently modulated light, if the light intensity and/or amount of light with different modulation frequency changes.

Preferably at least two partial areas can be irradiated with modulated light, the partial areas being irradiated with light of different modulation frequencies. This is favorable because the demodulator, through the waveform analysis of the sensor signals detected by the sensor, is thus able to determine which partial area is touched by a body and/or which partial area is approached by a body or from which partial area a body moves away or in which partial area a body is located. In other words, the light source is able to generate, in a time-wise separated manner, light with two modulation frequencies for two different partial areas so that a touch of one of the partial areas by a body can be determined.

It is also possible for the demodulator to evaluate only modulated light having a specific modulation frequency/specific modulation frequencies. For example, a portion of the projection region can be irradiated with modulated light, a change of which is detectable by a sensor. However, this sensor signal is not evaluated by the demodulator because it is not desired, for example, that a change in the light of the partial area will result in an action.

Moreover, a modulation and interference of sensitivity, i.e., more sensitive and/or better detection of a change, may be made possible by a change of the modulation frequency of the modulated light. The further the modulation frequency of the light is away from the switching frequencies of spatial light modulation, the better slightest changes of light, e.g., due to the touch of a partial area, may be detected.

Furthermore, the projection region or the partial areas can be irradiated with colored and/or white light, both colored and white light being modulatable. For example, an RGB light source may be utilized that alternatingly emits light of different color, whereby at least the light of one color is modulated. Moreover, the optical arrangement may include a color wheel, which can be located, for example, between the light source and the modulator and can be filtered by the white light so as to be colored. Furthermore, partial areas may have different colors. In other words, partial areas may be irradiated both with light of a different modulation frequency and with light of different color. Alternatively, a partial area can be irradiated with light having an identical modulation frequency and different colors.

The detection of a change in the modulated light by the sensor, for instance, may be improved in that the light of the partial area is changed during detection, i.e., the partial areas are changed dynamically. For example, the partial area in the projection region can be shifted, i.e., a position of the partial area being touched can be altered. This is of advantage as, for example, a direction of movement of a body, e.g., a finger, is easier to recognize.

The use of a self-learning artificial intelligence algorithm (AI algorithm) that correlates sensor signals and user inputs is also contemplated. Through the touch of a partial area, a corresponding sensor signal can be generated that is different depending on whether a body, for example, rapidly and deliberately approaches and touches the partial area, or whether a body is above the choice in a hesitating manner. An AI algorithm may be trained to distinguish such behaviors and, depending on the result, the touch and/or the approach of the body may then lead to a different reaction of the optical arrangement. This is favorable as a detection of changes by the sensor and/or an evaluation of the detected sensor signals by the demodulator becomes better the longer the optical arrangement is operated.

Based on the modulation frequency of the light, position detection with an accuracy of up to one spatial light modulator pixel is possible if the modulator is a spatial micromirror device. Larger partial areas irradiated with modulated light call for a better evaluable signal, meaning for example a higher modulation frequency.

The optical arrangement may project, for example, keys such as a numeric key pad. A person may input a key combination into the key pad, for example, for unlocking a vehicle in which the optical arrangement is integrated. The sensor or the demodulator preferably may also detect swiping and routing movements, i.e., a movement of the body.

In addition, the optical arrangement may be used for starting functions such as, for example, the charging process of an electric vehicle and/or for opening a trunk and/or darkening a window and/or displaying and hiding information. Also, the recognition of gestures by recognizing contours is possible.

In the method for detecting a change in the intensity of modulated light of a partial area of the optical arrangement, apriori the light of the light source is modulated at least occasionally and the spatial modulator is driven such that at least a partial area on the layer can be irradiated with modulated light. If a body touches the partial area, the sensor is able to detect a change in the modulated light, in particular due to the touch of the partial area by the body.

If the optical arrangement is located in a vehicle and the layer is, e.g., a side window and/or other window pane of the vehicle, it is possible to display movies and/or videos on the vehicle window by way of the optical arrangement. Also, a welcome scenario can be displayed by the optical arrangement upon the approach of a driver who has, e.g., a keyless go key. Alternatively, a driver may open a vehicle even without a key, e.g., by entering a pin on a key pad projected by the optical arrangement. In other words, the optical arrangement may be utilized in a large number of different vehicle panes and/or additional layers when interaction with a user is desired. The additional layer may be, for example, a transparent layer, which is located on the dashboard of the vehicle and which, through the optical arrangement, can be utilized, for example, for multi media purposes such as radio and/or music and/or navigation and/or for other interactions.

In a further embodiment, a plurality of optical arrangements can be integrated into a vehicle, wherein for instance all window panes of the vehicle or at least part of the window panes display a common animation and/or a movie. The movie or animation may be visible to passengers from outside and inside. Especially in autonomous vehicles, movies and/or animations can be shown by one or a plurality of optical arrangements while travelling.

Moreover, the modulated light with one modulation frequency may irradiate successively at least two different partial areas, for example, first number 1 on a key pad and then number 2, until the sensor detects a change in the intensity of the modulated light on one of the partial areas. The other number not irradiated with the light including a modulation frequency may be irradiated, for example, with unmodulated light and/or with modulated light of a different modulation frequency. In other words, the light source may be modulated, and the modulator may be driven such that a different partial area is respectively irradiated alternately and/or continuously in case of more than two partial areas until a body approaches or moves away from one of the partial areas and/or a body is located in the partial area and/or the body touches one of the partial areas. The demodulator detects which partial area a body has touched.

The at least one light source of the lighting device each may be formed as a light emitting diode (LED) and/or an organic LED (OLED) and/or a laser diode and/or a luminant functioning according to the laser activated remote phosphor (LARP) principle, and/or a halogen lamp, and/or a gas discharge lamp (high intensity discharge (HID)), and/or it may be formed in conjunction with a projector functioning according to the digital light processing (DLP) principle. Thus, a large number of alternatives are provided to be used as a light source for the lighting device in accordance with the invention.

Alternatively, the light source radiates light in the infrared range. A viewer of the optical arrangement may view a projection on a layer, for example, by using specific glasses and/or through an infrared camera, and may enter a code and/or a password on the key pad projected by the optical arrangement and/or a projected keyboard. Thus, security areas can be stored.

The spatial light modulator (SLM) in particular is a spatial micromirror device. However, the modulator may be, for example, also a digital micromirror device (DMD) or a liquid crystal display (LCD), or it may constitute one or plural micro-electromechanical systems (MEMS) or liquid crystal on silicon (LCOS) and/or mono-materials. Furthermore, the modulator may be digital or analog.

A digital micromirror device (DMD) has a large number of mirrors (micromirrors) which can be tilted at high frequency between two mirror positions and can each form a light pixel. Usually, in a first position of the mirror, incident light on the mirror is emitted from a vehicle headlamp and is directed to an absorber surface in a second position.

The optical arrangement can preferably be arranged in a vehicle, in particular a vehicle window, such as a windshield and/or a side window. For example, the vehicle window can be the at least partially transparent layer. The vehicle may be an aircraft or a water-bound vehicle or a land-bound vehicle. The land-bound vehicle can be a motor vehicle or a rail vehicle or a bicycle. Particularly preferable, the vehicle is a truck or a passenger car or a motorcycle. Moreover, the vehicle can be designed as a non-autonomous or semi-autonomous or autonomous vehicle.

The aspects presented here can advantageously also be applied to a vehicle with a trailer, whereby both the towing vehicle and the trailer may have the optical arrangement.

An optical arrangement comprising at least one spatial modulator for light, at least one light source and comprising at least one projection region, it being possible for the spatial modulator to be irradiated with the light from the light source, and the projection region being connected downstream of the spatial modulator in the beam path of the light, characterized in that the light source can be at least temporarily modulated and the modulator can be driven such that at least one portion of the projection region can be irradiated with the modulated light, and in that the optical arrangement comprises at least one sensor by way of which a change in the modulated light due to the approach and/or retreating of a body and/or due a body being located towards or in the partial area can be detected. Moreover, a method using the optical arrangement is provided.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
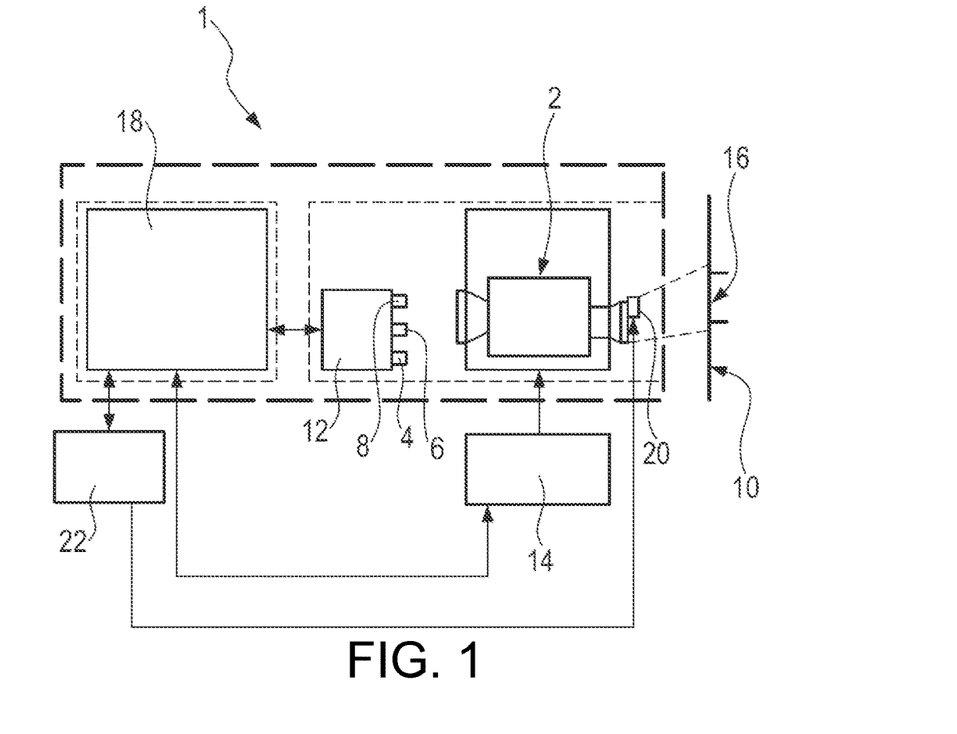
FIG. 1 is a schematic representation of an optical arrangement.

FIG. 1 shows an optical arrangement 1 comprising a digital micromirror device 2, light sources 4, 6, 8, and a projection region 10. The light sources 4, 6, 8 are driven by a light source driver 12, and the digital micromirror device 2 is driven by a micromirror device driver 14 so that at least a partial area 16 on the projection region 10 can be irradiated with modulated light. The light sources 4, 6, 8, which emit light of different colors, are preferably driven such that at least one of the light sources 4, 6, 8 emits modulated light. However, it is preferably also possible that light of different light sources 4, 6, 8, is modulated differently. The light source driver 12 and the micromirror device driver 14 form a computing element, which is part of a controller 18.

A sensor in the form of a photosensor 20 is located at the micromirror device 2. The sensor detects the scattered, modulated light reflected back from the partial area 16. In particular, the photosensor 20 is able to detect a change in the modulated light.

Moreover, demodulator 22 is part of the controller 18, which preferably is connected to the photosensor 20 via a wireless connection, such as bluetooth, for example, and/or via a cable. The demodulator 22 evaluates sensor signals of photosensor 20. If a threshold of the change is exceeded, the demodulator 22 may communicate to the controller 18, e.g., a touch on partial area 16, whereupon the controller, e.g., via light source driver 12 and/or micromirror device driver 14, controls the light sources 4, 6, 8 and micromirror device 2 such that the projection of the optical arrangement 1 is altered. In other words, an image viewed by a user in the projection region and/or in the partial area thereupon can be changed.

Figure 2A:
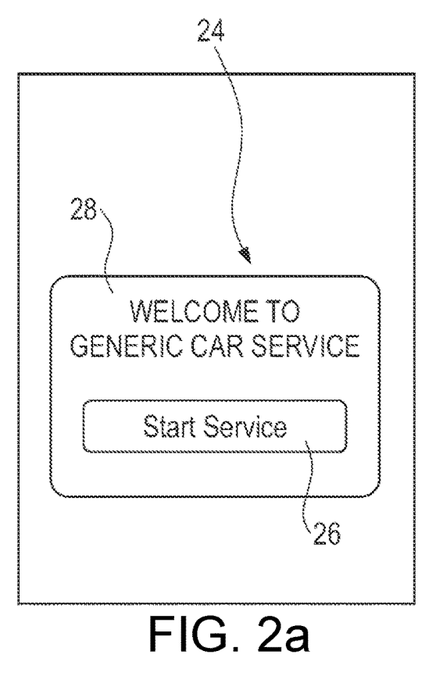
FIG. 2*a* is a top view on a projection region according to a first embodiment.

FIG. 2*a* shows a projection region 24 including two partial areas 26, 28 that are irradiated with light each having a different modulation frequency. The colors of the light of partial areas 26, 28 may be identical or different. The light of partial area 28 that encloses partial area 26 may also be unmodulated. Partial area 26 preferably is a partial area that can be touched by a user and/or a body.

Figure 2B:
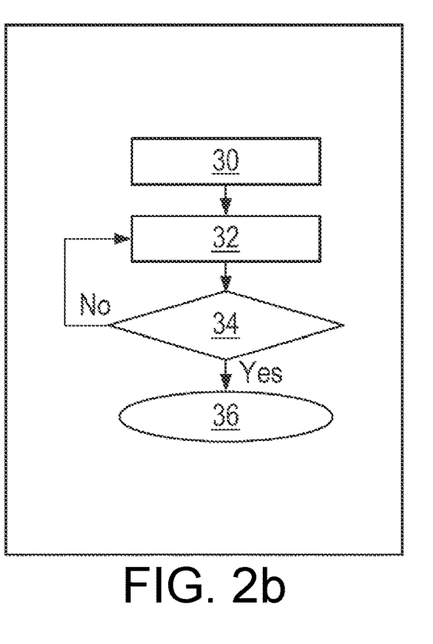
FIG. 2*b* is a flow diagram of a method in accordance with the first embodiment.

FIG. 2*b* depicts the process of a method. In a first step 30, at least one light source and one modulator, e.g., light sources 4, 6, 8 and micromirror device 2 of FIG. 1 are driven via a control device, for example, controller 18, such that partial areas 26, 28 are depicted in the projection region 24. In step 32, a sensor signal, e.g., the sensor signal of photosensor 20, is evaluated by a demodulator, demodulator 22 of FIG. 1, for example. The sensor signal of photosensor 20 in particular detects the light reflected back from partial area 26. In a next step 34 it is examined whether the evaluated sensor signal of partial area 26 changes and/or whether (YES) or not (NO) the change of the sensor signal of partial area 26 is larger than the threshold value of the change. In case the sensor signal includes data containing a change in the light of partial area 28, i.e., in case of a change in the light including the modulation frequency associated with partial area 28, such data is not evaluated, as no action takes place in case partial area 28 is touched. If the demodulator 22 detects in step 34 that a change has occurred and/or that the change is larger than the threshold value, i.e., YES after step 34, it is determined in step 36 that an approach to partial area 20 has occurred. In case it is determined in step 34 that no change in the light is provided and/or that the change is smaller than the threshold value, i.e., NO after step 34, step 32 is repeated.

Figure 3A:
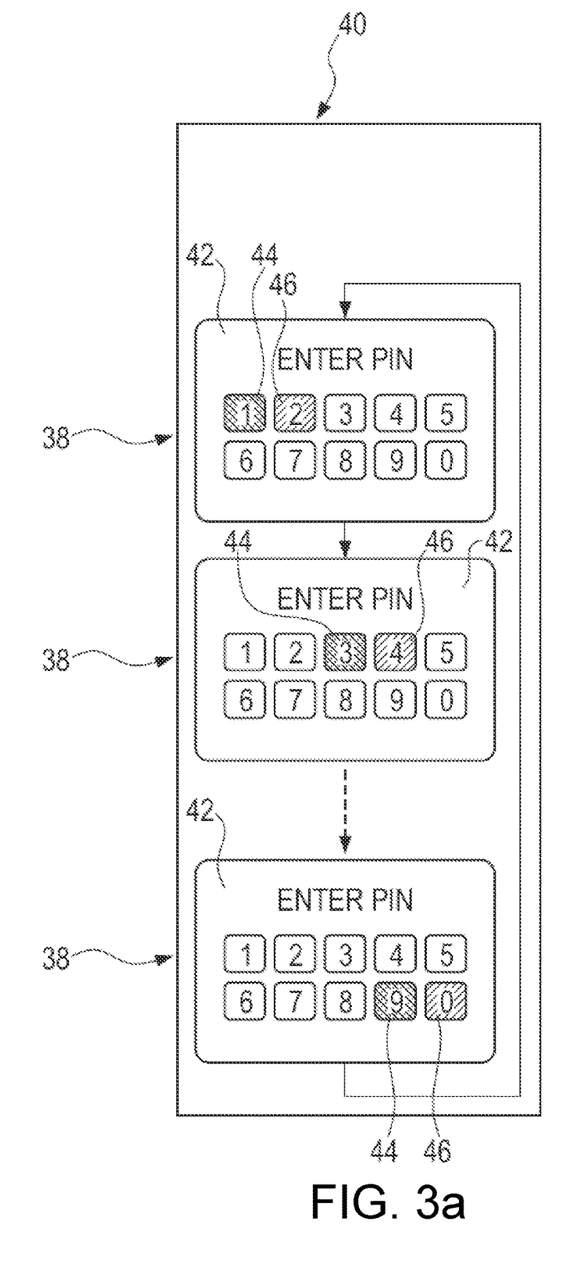
FIG. 3*a* is a top view of a projection region according to a further embodiment.

FIG. 3*a* depicts projection region 38, it being represented in three different states. In other words, the process of a change of projection region 38 is depicted. The projection region 38 shows to a user a numeric keypad including keys for numbers 0 to 9 for entering, for instance, a pin in order to unlock a vehicle 40 in which the optical arrangement is provided. The projection region 38 has at least three partial areas, partial area 42 providing a base environment. To a user, partial area 42 is a region merely serving for information and preferably, a touch of partial area 42 by a body does not release any action.

In a first step I of the sequence of change of the projection region, partial area 42 comprises the environment around the keys and the regions of numerals 0, 3 to 9. The second partial area 44 includes the region of number 1, and the third partial area 46 includes the region of number 2. Partial areas 42, 44, 46 each are irradiated with light of a different modulation frequency. Partial areas 42, 44, 46 have different colors for clarity reasons. To a viewer, partial areas 42, 44, 46 have the same color. In other words, the partial areas are irradiated with light of the same color, but with a different modulation frequency.

In a second step II, partial area 42 further detects the environment and the regions of numbers 0 to 2 and 5 to 9. The second partial area 44 comprises the region of number 3 and the third partial area comprises the region of number 4.

In a further third step III, which is not depicted here, partial area 42 comprises the environment and the regions of numbers 0 to 4 and 7 to 9, while partial area 44 comprises the region of number 5 and partial area 46 comprises the region of number 6. In the next fourth step IV, all regions of numbers 7 and 8 are comprised by partial areas 44 and 46.

In the last fifth step V, which is shown here, the regions of numbers 9 and 0 are comprised by partial areas 44, 46, while the remaining part of the projection region is comprised by partial area 42. Then, the steps are carried out again from the beginning.

Figure 3B:
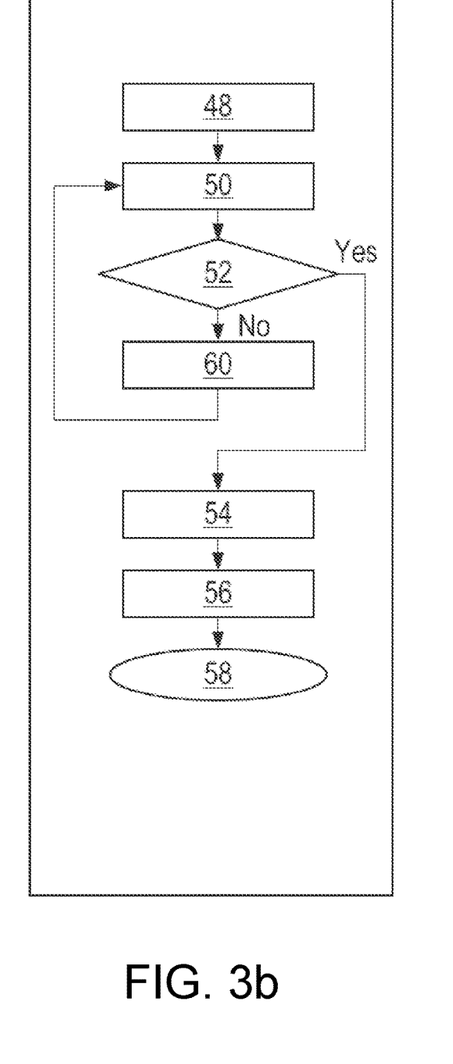
FIG. 3*b* is a flow diagram of a method in accordance with the further embodiment.

In the flow diagram in FIG. 3*b*, in a first step 48, partial areas 42, 44, 46 modulated with different modulation frequencies are depicted in the projection region. One of the projection regions depicted in FIG. 3*a* is shown, e.g., the projection region of step I, in which the partial area 42 comprises the environment and the regions of numbers 0, 3 to 9, partial area 44 the region of number 1, and partial area 46 the area of number 2. However, any arbitrary step I-V may be depicted.

In subsequent step 50, the changes detected by the sensor, e.g., photosensor 20 in FIG. 1, are evaluated by the demodulator. In step 52, it is then examined whether (YES) or not (NO) a change in the light of partial areas 44, 46 has occurred.

If a change is detected in step 52, i.e., YES after step 52, the position of the partial area is determined in step 54, i.e., it is verified which regions of which numbers are comprised by partial areas 44, 46, i.e., which projection region 38 of steps I-V is displayed by the optical arrangement. Furthermore, it is examined in the step which modulated light of which partial area 42, 44 is affected by a change.

Subsequently, in step 56, the sensor signal is correlated with a modified signal so that it can be detected in step 58 which key is touched by a body, i.e., the final detection as to which partial area was touched is made here. From the correlation of the time sequence of steps I-V and the time sequence of the sensor data evaluated by the demodulator, in particular the evaluation of the sensor data of partial areas 42, 44, 46, it can be determined whether a touch has occurred and what number can be associated with it. Here, the final detection of a touch of, e.g., number 3 is made.

If no alteration is detected in step 52, i.e., NO after step 52, the partial areas alter in step 60 corresponding to the sequence of change of projection region 38 in FIG. 3*a*. In other words, a different partial area 38 of steps I-V of the optical arrangement is depicted.

Figures 4A, 4B:
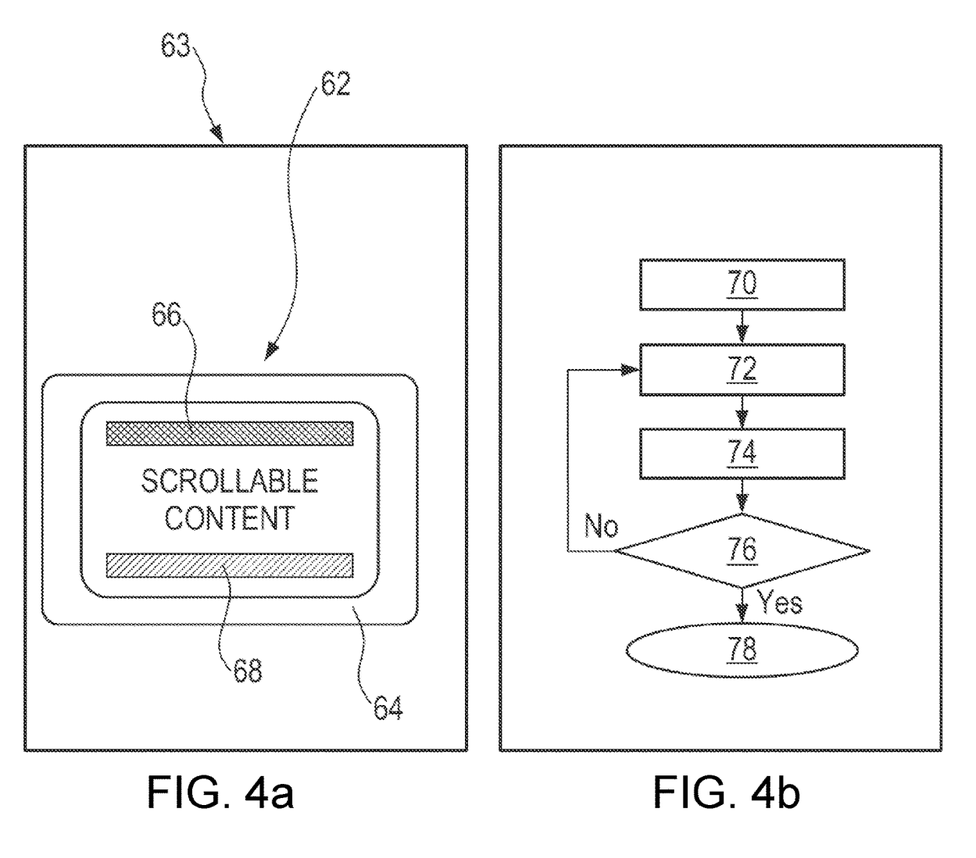
FIG. 4*a* is a top view on a projection region according to yet another embodiment.
FIG. 4*b* is a method in accordance with yet another embodiment.

FIG. 4*a* shows a further top view of projection region 62. The projection region 62 may be arranged on a window pane 63 for a vehicle. The projection region 62 has three partial areas 64, 66, 68, partial area 64 being the base area and preferably no action is carried out if partial area 64 is touched. Partial area 66 is located in an upper portion of projection region 62, and partial area 68 is located in a lower portion of the projection region. Between the two partial areas 66, 68 partial area 62 may display, for example, user information. Such information preferably is continuous, i.e., it represents "scrollable" content. In other words, the text and/or the information continues above and below the information displayed by the optical arrangement.

FIG. 4*b* shows a corresponding flow diagram. In a first step 70, a modulator, the micromirror device 2 of FIG. 1, for example, and at least one light source, for instance light sources 4, 6, 8 of FIG. 1 are driven such that the partial areas displayed in projection region 62 are shown.

In step 72, a change detected by the sensor is evaluated by the demodulator and in a further step 74, the shapes of partial areas 64, 66, 68, which are represented in the projection region 62, are analyzed. For example, by evaluating the sensor signals of partial areas 64, 66, 68, it is verified by the modulator whether a body scrolls, for example, the image, which means, e.g., that a body moves upwards from below via one of partial areas 66, 68. The movement may be recognized and evaluated by evaluating the time sequence of the sensor signals of partial areas 64, 66, 68.

Subsequently, it is verified in step 76 whether an approach to and/or retreating from the partial area and/or the location of a body in the partial area may involve a change of the partial area, i.e., whether the operation of one of the partial areas can be validated. In other words, it is checked whether (YES) or not (NO) a change in the light of one of the partial areas releases an action. The evaluation of movements and/or contacts requires very good signal analysis. Preferably, a compromise is required between error-free and highly sensitive detection of a touch and/or a movement. Therefore, an AI algorithm in particular analyzes the sensor signals evaluated by the demodulator and determines whether the signal curve corresponds to a "validated gesture", which thus has been recognized sufficiently accurately.

If the answer after step 76 is YES, a touch, for example, is validated in step 78. In other words, it is determined that an approach and/or retreating and/or an arrangement in or towards one of portions 66, 68 has occurred.

If the answer after step 76 is NO, step 72 is performed again.

REFERENCE NUMERALS

Optical arrangement 1
Micromirror device 2
Light source 4, 6, 8
Projection region 10, 24, 38, 62
Light source driver 12
Micromirror device driver 14
Portion/partial area 16, 26, 28, 42, 44, 46, 64, 66, 68
Controller 18
Photosensor 20
Demodulator 22
Step 30-36, 48-58, 70-78
Vehicle 40
Pane 63

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. An optical arrangement comprising:
    a light source that emits modulated light;
    a spatial modulator, wherein the spatial modulator receives the modulated light emitted from the light source;
    a projection region disposed in a beam path of the modulated light downstream of the spatial modulator, wherein the spatial modulator is adapted to control the modulated light received from the light source such that a first portion of the projection region is irradiated with the modulated light;
    a sensor configured to detect the modulated light that is reflected back from the projection region, wherein the sensor also detects a change in the modulated light that is reflected back from the projection region; and
    a demodulator configured to evaluate a sensor signal output by the sensor, wherein the demodulator determines based on the sensor signal that contact by an object has been made with the first portion of the projection region.

2. The optical arrangement of claim 1,
    wherein the demodulator determines based on the sensor signal that the object is approaching the first portion of the projection region.

3. The optical arrangement of claim 1, wherein the demodulator uses an artificial intelligence algorithm to evaluate the sensor signal.

4. The optical arrangement of claim 1, wherein the spatial modulator has a switching frequency, and wherein the light source emits light having a modulation frequency that is at least ten times greater than the switching frequency.

5. The optical arrangement of claim 4, further comprising:
a computing element adapted to modify the modulation frequency in response to the sensor detecting the change in the modulated light.

6. The optical arrangement of claim 1, wherein the spatial modulator is adapted to control the modulated light such that the first portion of the projection region is irradiated with modulated light having a first modulation frequency and such that a second portion of the projection region is irradiated with modulated light having a second modulation frequency.

7. The optical arrangement of claim 1, wherein the first portion of the projection region that is irradiated with the modulated light is a partially transparent layer.

8. The optical arrangement of claim 7, wherein the change in the modulated light that is reflected back from the projection region is caused by a change in transmission of the modulated light passing through the partially transparent layer.

9. The optical arrangement of claim 7, wherein the change in the modulated light that is reflected back from the projection region is caused by a change in a magnitude of reflection of the modulated light off of the partially transparent layer.

10. The optical arrangement of claim 7, wherein the sensor is configured to detect changes in the modulated light on both sides of the partially transparent layer.

11. The optical arrangement of claim 1, wherein the modulated light that irradiates the first portion of the projection region is white light or colored light.

12. The optical arrangement of claim 1, wherein the spatial modulator is a spatial micromirror device.

13. The optical arrangement of claim 1, wherein the projection region is a window pane.

14. A method comprising:
modulating light to generate first modulated light having a first modulation frequency;
receiving the first modulated light from a light source;
projecting the first modulated light onto a first portion of a projection region, wherein the projection region is disposed in a beam path of the first modulated light downstream of a spatial modulator that receives the first modulated light; and
detecting the first modulated light that is reflected back from the projection region, wherein a change is detected in the first modulated light as a result of an object approaching the first portion of the projection region when the object enters the beam path of the first modulated light downstream of the spatial modulator.

15. The method of claim 14, wherein the change in the first modulated light is detected as a result of the object contacting the first portion of the projection region.

16. The method of claim 14, wherein the change that is detected in the first modulated light is an intensity of the first modulated light.

17. The method of claim 14, further comprising:
demodulating the first modulated light that is reflected back from the projection region to determine that the object has contacted the first portion of the projection region.

18. The method of claim 14, wherein the first modulated light is successively projected onto different portions of the projection region until a change is detected in the first modulated light.

19. The method of claim 14, further comprising:
modulating light to generate second modulated light having a second modulation frequency;
receiving the second modulated light from the light source; and
projecting the second modulated light onto a second portion of the projection region.

20. The method of claim 19, further comprising:
detecting a change in the second modulated light when the object contacts the second portion of the projection region, wherein the change that is detected in the second modulated light is an amplitude of the second modulated light.

* * * * *